Dec. 21, 1965 A. W. MASSMAN 3,225,139

GATED TRANSISTOR A.G.C. IN WHICH GATING CAUSES BASE TO COLLECTOR CONDUCTION

Filed Feb. 26, 1963

INVENTOR.

Albert W. Massman

BY

Mueller & Aichele

Attys.

United States Patent Office 3,225,139

Patented Dec. 21, 1965

3,225,139

GATED TRANSISTOR A.G.C. IN WHICH GATING CAUSES BASE TO COLLECTOR CONDUCTION

Albert W. Massman, Wheaton, Ill., assignor to Motorola, Inc., Chicago, Ill., a corporation of Illinois Filed Feb. 26, 1963, Ser. No. 261,054
7 Claims. (Cl. 178—7.3)

Figures 1, 2:
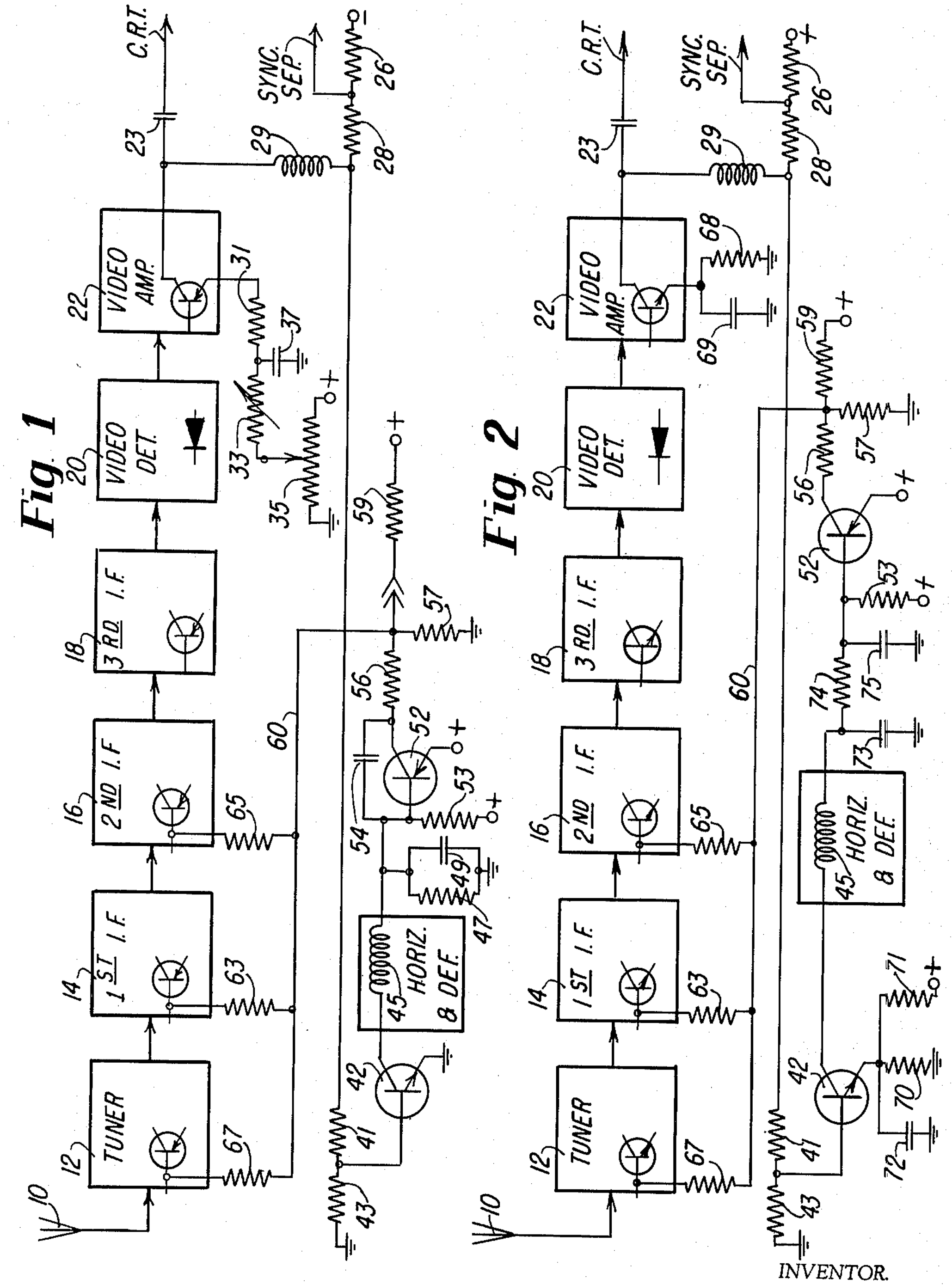

This invention relates to television receivers and more particularly to a gain control circuit especially useful in transistorized television receivers.

It is common to provide an automatic gain control system in a television receiver in order to maintain relatively constant signal reproduction with variation in incoming signal strength. Since the video portion of the signal received by a television receiver contains a D.C. component which varies with the brightness of the scene being televised, it is desirable to provide an automatic gain control (AGC) circuit in the receiver that is responsive to the synchronizing portion of the received signal, which is transmitted with a fixed percentage of modulation. To this end means are generally provided to gate the automatic gain control system at the horizontal sweep rate of the receiver so that the incoming signal is sampled by the AGC system only when synchronizing signals are present.

It is necessary in such systems that the maximum excursion or tips of the received synchronizing signals be compared to a reference potential so that the derived AGC voltage, which typically is obtained from the detected composite video signal, is substantially independent of gain setting or bias shifts inherent in the receiver. And in transistorized receivers, where the gain controlled stages such as the RF and IF stages, as well as the video stages from which the composite video signal is obtained, may be either PNP or NPN transistors with operating and biasing voltages of either positive or negative polarity, automatic gain control action may be accomplished by either increasing or decreasing bias to drive the gain controlled transistors into saturation (forward AGC) or to cutoff (reverse AGC). Thus, for a simplified and versatile gated AGC system which utilizes a minimum number of circuit elements and is readily adaptable to state of the art changes in transistor receiver design, it is desirable that the AGC gate be responsive to horizontal retrace pulses of either polarity and be readily adaptable to provide either forward or reverse AGC bias to either PNP or NPN transistors in the RF and IF stages of the receiver.

It is therefore among the objects of the invention to provide an improved gated AGC control system for transistorized television receivers.

A further object is to provide a simple and improved gated AGC system which may be conveniently adapted to provide either forward or reverse AGC bias to either PNP or NPN gain control stages in a transistorized television receiver.

Still another object is to provide an AGC system for a transistorized television receiver which may be gated by either positive going or negative going horizontal retrace pulses derived from the deflection circuits of the receiver to produce AGC of the desired polarity.

A feature of the invention is the provision of an improved transistorized AGC system having a transistor gated by horizontal retrace pulses in the receiver to develop a gain control signal which is proportional to the average level of the synchronizing signal component of the detected composite video signal in the receiver, which signal may be readily adaptable to supply either forward or reverse bias to either PNP or NPN stages in the receiver.

Another feature of the invention is the provision of a gated transistor which conducts to adjust the charge of a capacitor in the AGC system of a television receiver when individual synchronizing signals of the composite video signal exceed a reference level to thereby develop an AGC voltage with respect to such reference level.

Another feature is the provision, in a gated AGC system of the above-described type, of an NPN gating transistor which is responsive to horizontal retrace pulses of either positive or negative polarity to result in either polarity AGC voltage.

Still another feature of the invention is the provision of a gated AGC system for a transistorized television receiver which may be readily adaptable to be utilized with either PNP or NPN RF and IF and video stages of the receiver without substantial circuit modification.

Other objects, features and attending advantages of the invention will become apparent from the following description when taken in conjunction with the accompanying drawings, in which:

FIG. 1 is a schematic circuit diagram partly in block form of a portion of a television receiver in accordance with one embodiment of the invention, particularly adapted for use with PNP RF, IF and video stages in the receiver; and FIG. 2 is a circuit diagram of a receiver utilizing a modified embodiment of the invention, particularly adapted for use with NPN RF, IF and video stages in the receiver.

In practicing the invention the symmetrical conduction properties of a properly biased NPN transistor is advantageously utilized in a gated AGC circuit for a transistorized television receiver. A composite video signal including positive going synchronization signals is derived from a viedo stage of the receiver and coupled to the input base electrode of the NPN gating transistor. The emitter electrode of the NPN gate is connected to a reference potential while its collector electrode is series connected through a winding on the horizontal deflection transformer of the receiver to a storage capacitor. When positive going synchronizing signals which occur in time coincidence with the retrace pulses coupled to the collector electrode exceed the reference potential by an incremental amount, the NPN gate tends to conduct to draw current in proportion to the level of individual synchronizing signals. This adjusts the charge on the storage capacitor connected to the collector electrode of the NPN gate, which capacitor is in circuit with a resistor to provide a time constant sufficiently longer than the recurrence period of the synchronizing signals. Accordingly, the AGC voltage thereby developed represents the average level of the synchronizing signal component of the detected composite video signal. This AGC voltage in turn controls a transistor D.C. amplifier to provide AGC bias in a given direction to the RF and IF stages of the receiver.

When a positive going retrace pulse is applied to the collector electrode of the NPN gate its collector-to-emitter junction conducts to develop the AGC voltage in one direction, while when a negative going retrace pulse is applied to its collector electrode its base-to-collector junction conducts to develop the AGC voltage in the other direction. Thus, the gating may be achieved with retrace pulses of either polarity to produce the desired AGC action. In addition, the D.C. amplifier may be arranged to go from saturated conduction to cutoff or from cutoff to saturated conduction to provide either forward or reverse bias for either PNP or NPN gain controlled stages in the receiver.

Referring now to FIG. 1, television signals received at antenna 10 are coupled to tuner 12 for initial processing. Tuner 12 may include, for example, a plurality of RF amplification stages, one of which is represented diagramatically as a PNP transistor, and a first detector or mixer for providing an intermediate frequency signal.

The intermediate frequency signal is coupled successively to IF stages 14, 16 and 18 and then to video detector 20 where a composite video signal is recovered from the carrier wave. As represented IF stages 14, 16 and 18 may include PNP transistors and typically IF stages 14, and 16 as well as selected RF stages in tuner 12, may have a biasing arrangement which is subject to an automatic gain control signal. As is conventional, IF stage 18 is sharply tuned and for maximum selectivity and stability and accordingly not subjected to automatic gain control.

The detected composite video signal provided by video detector 20 is supplied to one or more video amplification stages 22, and subsequently coupled through capacitor 23 to the cathode electrode of the cathode ray tube of the receiver. In the embodiment shown PNP transistors are used in video amplifier stages 22, the final stage of which is illustrated diagramatically. Accordingly, the video stages are supplied with a negative collector voltage through resistors 26 and 28 and peaking coil 29 from a negative source. To provide sufficient drive for the cathode ray tube of the receiver a relatively large collector voltage is utilized and as is conventional practice may be derived from a rectifier circuit associated with the horizontal output transformer of the receiver to provide a negative potential in the order of −100 volts. A positive emitter bias in the order of +10 to +15 volts is supplied to the PNP transistors of the video stages. In the final video stage illustrated the emitter biasing circuit may include fixed resistor 31 series connected with variable resistor 33 to the movable tap on potentiometer 35. Resistor 33 functions as a contrast control and potentiometer 35 provides an adjustable bias from the positive source so that the final video stage may be provided with maximum swing for all incoming signal levels in the presence of AGC. The tap point between resistor 31 and variable resistor 33 is bypassed to ground by capacitor 37 to prevent undue degeneration.

The output composite video signal is a positive going signal and it may be seen from the voltages applied to the final video stage that the maximum excursions or synchronizing signal component thereof swings from approximately −100 volts to a positive voltage in the order of +10 volts. This signal is supplied through resistor 41 to the input base electrode of AGC gating transistor 42. Resistor 43, having a small value with respect to resistor 41, connects the base electrode of transistor 42 to ground reference potential. It can be seen that because of direct connection with the negative collector supply for the video amplifier stages a voltage dividing arrangement is provided by resistors 41 and 43 so that the base electrode of transistor 42 is maintained slightly negative with respect to ground reference potential. With the emitter electrode of NPN transistor 42 connected directly to ground, its base is thereby negative with respect to its emitter and thus in a normally cutoff condition.

The collector electrode of transistor 42 is returned to ground reference potential through resistor 47 and a winding 45 located on the core of the horizontal output transformer in the horizontal deflection circuit of the receiver. As hereinafter discussed, the direction of winding 45 may be such to couple either positive going or negative going pulses to the collector electrode of transistor 42. It is to be understood that voltage pulses at the horizontal sweep rate (15.75 kc.) are developed in winding 45 to provide a recurrent collector voltage for transistor 42 which occurs in time coincidence with the synchronizing signals of the composite video signal. Storage capacitor 49 is connected in shunt with resistor 47 and forms a time constant network therewith so that the periodic output signal received from transistor 42 develops an essentially sawtooth voltage across capacitor 49.

The voltage developed across capacitor 49 by the gating action of transistor 42 is coupled to the input base electrode of AGC amplifier transistor 52, which conveniently may be a PNP transistor. The emitter electrode of transistor 52 is connected to a positive source while its base electrode is connected through resistor 53 to a positive source. A relatively large value capacitor 54 may be coupled between the collector and base electrodes of transistor 52 to provide filtering for the sawtooth voltage applied to its input electrode and to further stabilize the time constant of the AGC system. Such a circuit arrangement functions as a Miller integrator, wherein the effectiveness of capacitor 54 as a filter is multiplied by the gain of the transistor by the degenerative action therein. It is to be understood, however, that alternately a conventional RC filtering network such as a series resistor and shunt capacitor may be interposed between the common connection of resistor 47 and capacitor 49 and the input base electrode of transistor 52 to provide the necessary filtering of the AGC voltage developed across capacitor 49.

The collector electrode of transitsor 52 is returned to ground reference potential through resistor 56 in series with resistor 57. The junction point between resistors 56 and 57 are connected to AGC lead 60 so that a gain control signal may be distributed to the base electrodes of selected RF and IF stages of the receiver. To this end the base electrodes of IF stages 14 and 16 may be connected to AGC lead 60 by resistors 63 and 65, respectively, while the base electrode of one or more RF stages in tuner 12 may be connected to AGC lead 60 by resistor 67.

It is to be noted that operation of the above described AGC system, with slight circuit modifications, is contingent upon the direction of AGC voltage desired. As is known, gain control of transistors may be obtained by driving them either towards saturation or towards cutoff, and this is conveniently accomplished by adjusting their base biasing voltages in the appropriate direction, depending on whether PNP or NPN transistors are used. Forward bias (driving the transistors into saturation) is preferable at the present state of the transistor art and accordingly the AGC system of FIG. 1 is readily adaptable to provide forward bias for the PNP transistors shown in the RF and IF stages of the receiver. To this end the value of emitter bias supplied through resistor 53 to the base electrode of PNP transistor 52 is selected to be sufficiently negative with respect to the voltage supplied to its emitter electrode to maintain it in a state of saturated conduction. Thus, there is a current path from the positive emitter voltage of transistor 52 through resistor 56 and resistor 57 to ground reference potential. A voltage division is provided at the junction point between resistor 56 and resistor 57 and a positive voltage supplied on AGC lead 60 as a quiescent bias for the base electrodes of selected stages in the receiver. This voltage is less than the positive emitter voltage normally supplied to these stages so that they are conducting a predetermined amount, less than saturation.

As previously mentioned, relatively low value resistor 43 maintains the base electrode of gating transistor 42 slightly negative with respect to its grounded emitter electrode. When synchronizing signals of the composite video signal coupled through resistor 41 to the base electrode of transistor 42 exceed zero voltage by an incremental amount, transistor 42 tends to conduct. A negative going pulse coupled to its collector electrode by winding 45 at this time will result in conduction of the base-to-collector diode of NPN transistor 42, and accordingly there will be a current path from ground reference potential through resistor 43 and the base-to-collector diode of transistor 42 to charge capacitor 49 to a positive value. The amount which capacitor 49 is charged depends on the degree which the base electrode of transistor 42 is made positive with respect to its emitter electrode by synchronizing signals and accordingly the average value of the sawtooth signal developed across the time constant network of resistor 47 and capacitor 49 is proportional to the level of the received signal, as established by the synchronizing signal component of the composite video signal.

An increased positive average input to the base electrode of transistor 52 drives it out of saturation and towards cutoff so that it presents an increasingly higher impedance path. As a result there is a decreased in the voltage appearing at the junction of resistors 56 and 57, with a corresponding decrease in the voltage appearing on AGC lead 60. Accordingly, the base electrodes of the gain controlled stages in the receiver are driven less positive with respect to these emitter electrodes, or into saturation, and this provides the desired forward bias AGC action.

In instances where reverse AGC action is desired, that is, where the gain controlled stages of the receiver are driven towards cutoff, AGC amplifier transistor 52 is biased to cutoff. This biasing may be accomplished, for example, by bypassing the emitter electrode of transistor 52 to ground reference potential and further providing a voltage dividing network for its emitter bias supply so that its base electrode is maintained positive with respect to its emitter electrode. Under these conditions quiescent bias on AGC lead 60 is supplied from a positive source through resistor 59 by the alternate connection shown in FIG. 1. Voltage division action between resistor 59 and resistor 57 is provided so that the collector electrode of transistor 52 remains negative with respect to its emitter electrode. Positive going pulses are now coupled to the collector electrode of gating transistor 42 by winding 45 so that there is conduction through its collector-to-emitter path to ground reference potential to allow discharge of capacitor 49 in the presence of synchronizing signals supplied to its base electrode which exceed zero potential. The amount of this conduction is controlled by the amplitude of the synchronizing pulses with respect to zero and accordingly there is a proportionate reduction in the charge maintained by capacitor 49. Thus increasing synchronizing signal level reduces the average value of the sawtooth voltage supplied to the input base electrode of transistor 52 and it is driven from cutoff to increasing conduction. Since the emitter electrode of transistor 52 is positive with respect to the voltage appearing at the junction point of resistors 56 and 57, increased conduction results in an increased positive potential at this point to supply a positive going AGC signal on lead 60. This drives the gain control stages of the receiver into cutoff and the desired reverse AGC action is achieved.

A further embodiment of the AGC system of the invention, wherein NPN transistors are used in the RF, IF and video stages of the receiver, is shown in FIG. 2 where like reference numerals refer to like circuit elements. It is to be understood that in the receiver illustrated in FIG. 2 the tuner, the IF stages and the video stages include NPN transistors and accordingly utilize a positive collector potential, with their emitter electrodes maintained at or near ground reference potential. Under these conditions, the positive going detected composite video signal has a swing from some value slightly above ground reference to a relatively high positive value.

As shown in FIG. 2, the emitter electrode of the final stage of the NPN transistor video amplifier is connected to ground reference potential by a relatively low valued stabilizing resistor 68, bypassed by capacitor 69. A positive potential is supplied to its collector electrode through resistors 26 and 28 and peaking coil 29. As previously mentioned, this high valued collector voltage may be derived from a rectifier associated with the horizontal out put transformer of the receiver and in the instance where NPN video transistors are used may be in the order of +160 volts. The input base electrode of NPN AGC gate 42 is direct current connected through resistor 41 to the junction point between resistor 28 and peaking coil 29. A relatively low valued resistor 43 connects the base electrode of transistor 42 to ground reference potential. Since the base electrode of transistor 42 is now connected to a positive potential, its emitter electrode is also supplied with a positive bias by the voltage divider arrangement of resistors 70 and 71, bypassed by capacitor 72, to insure that it remains cutoff in the absence of synchronizing signals at its base electrode of a predetermined level.

A positive potential is connected to the emitter electrode of AGC amplifier transistor 52 and its base electrode is biased sufficiently positive by a positive potential connected to resistor 53 to maintain it in a normally cutoff condition. The voltage divider including resistors 57 and 59 provide a positive collector voltage for transistor 52, as well as supplying a quiescent bias to the base electrodes of the NPN stages of the receiver on AGC lead 60. The values of resistors 57 and 59 are selected so that the voltage appearing at their junction is less than the emitter voltage supplied to the transistor 52. Resistor 56 is sufficiently less than resistor 59 so that when transistor 52 becomes conductive the voltage at the junction point of resistors 57 and 59 tends to rise.

The collector electrode of NPN gating transistor 42 is connected through winding 45 to one side of capacitor 73, the other side of which is returned to ground reference potential. A filter circuit including series resistor 74 and shunt capacitor 75 connects the junction point of winding 45 and capacitor 73 to the base input electrode of transistor 52. Capacitor 73 is charged from the positive base bias source for transistor 52 through resistor 53 and resistor 54, and is normally charged to a value substantially equal to the emitter voltage supplied to transistor 52 so that transistor 52 is held in a state of nonconduction.

When positive going synchronizing signals developed across resistor 43 rise to a level which makes the base electrode of transistor 42 positive with respect to the bias supplied to its emitter electrode, transistor 42 tends to conduct. Concurrently a positive going pulse coupled from the horizontal output transformer by winding 45 to the collector electrode of transistor 42 produces collector-to-emitter conduction and this provides a variable impedance shunt path to ground reference potential for capacitor 73. The magnitude of this impedance is determined by the conduction of transistor 42, which in turn is controlled by the level of synchronizing signals supplied to its base electrode. The average charge developed across capacitor 73 is therefore proportional to the level of the received signal, as determined by the magnitude of synchronizing signal component of the composite video signal. It is to be noted that the average charge on capacitor 73 is reduced in the presence of increasing synchronizing signal strength and capacitor 73 is recharged between individual synchronizing pulses through resistors 53 and 54, which with capacitor 73 form a time constant for the AGC circuit. Due to the filtering action of resistor 54 and capacitor 75, a relatively smooth average voltage is supplied to the base electrode of transistor 52.

As the synchronizing signal level increases, resulting in a decrease in the average signal level supplied to the base electrode of transistor 52, it is driven out of cut off and into increased conduction. This reduces the impedance of its emitter-to-collector path, and accordingly increased voltage appears at the junction point of resistors 57 and 59. This tends to increase the positive voltage appearing on AGC lead 60 and accordingly the NPN transistors in the gain controlled stages of the receiver are driven into saturation and the desired forward AGC action is obtained.

In instances where reverse AGC is desired for the gain controlled NPN stages of the receiver, transistor 52 is biased such that its base electrode is sufficiently negative with respect to its emitter electrode to be maintained in a state of saturated conduction. Resistor 59 is not included in the circuit and the positive emitter voltage of transistor 52, in conjunction with the voltage division action of resistor 56 and resistor 57, provides the quiescent bias voltage on AGC lead 60 for the gain controlled stages for the receiver. A negative going pulse is supplied to the collector electrode of transistor 42 by winding 45 so that its base-to-collector diode is rendered conductive to thereby charge capacitor 73 when the level of synchronizing signals applied to the base electrode of transistor 42 become positive with respect to its emitter bias. Accordingly, increasing level of synchronizing signals results in an increased average voltage supplied to the base electrode of transistor 52 and it is driven out of saturation to become less conductive. As the impedance of transistor 52 increases, the voltage developed at the junction of resistors 56 and 57 is reduced so that the bias supplied on AGC lead 60 to the gain controlled NPN stages of the receiver is reduced to thereby drive them towards cutoff.

The invention provides therefore an improved automatic gain control system for transistorized television receivers. A simple and effective circuit is readily adaptable to provide either forward or reverse AGC action to either PNP or NPN gain controlled stages of the receiver with a minimum of circuit modification. Because of symmetrical properties of the NPN transistor used for AGC gating, either positive or negative pulses can be supplied to its collector electrode from the horizontal output transformer of the receiver, and when used with a properly baised AGC amplifier the desired AGC action is readily attained. The biasing applied to the input base electrode of the NPN gating transistor provides a suitable reference for synchronizing pulses so that a reference level for the AGC voltage is maintained.

While a particular embodiment of the invention has been shown and described, modifications may be made and it is intended in the appended claims to cover all such modifications as fall within in the true spirit and scope of the invention.

I claim:

1. In a television receiver the combination including, signal amplification means having a plurality of PNP transistor stages for translating received television signals; bias circuit means connected to a control electrode of said PNP signal translating transistors to supply a gain control potential thereto; detector means coupled with said signal amplification means for providing a composite video signal containing a synchronizing signal component; video amplification means including at least one PNP transistor stage for coupling said composite video signal to utilization means; a source of periodically recurring negative-going voltage pulses including a winding on the horizontal output transformer located in said receiver; an NPN gating transistor having base, collector and emitter electrodes; circuit means direct current coupled between the base electrode of said NPN gating transistor and said PNP video amplification transistor to couple a composite video signal thereto; time constant circuit means including a storage capacitor; means connecting said winding on the horizontal output transformer between the collector electrode of said NPN gating transistor and said storage capacitor, with recurring voltage pulses of negative-going polarity induced in said winding providing conduction of the base-to-collector diode in said NPN gating transistor in time coincidence with synchronizing signals applied to the base electrode thereof, said capacitor being charged so that said time constant circuit means develops a control voltage in accordance with changes in the average level of said synchronizing signals; a PNP control transistor normally biased to a saturated condition having base, emitter and collector electrodes, with the emitter and collector electrodes of said control transistor connected between said bias circuit means and a reference potential and circuit means for coupling the control voltage developed by said time constant network means to the base electrode of said control transistor, with increasing sychronizing signal level increasing the charge of said storage capacitor to drive said PNP control transistor towards non-conduction, thereby producing a corresponding change in the gain control potential supplied to said signal translating transistors by said bias circuit means.

2. In a television receiver the combination including, signal amplification means for amplifying received television signals, bias circuit means connected to said signal amplification means to supply the gain control potential thereto, detector means coupled with said signal amplification means for providing a composite video signal containing a synchronizing signal component, video amplification means for coupling said composite video signal to utilization means, a source of periodically recurring negative-going voltage pulses including a winding on the horizontal output transformer from said receiver, an NPN gating transistor having base, collector and emitter electrodes, circuit means direct current coupling said video amplification means to the base electrode of said NPN transistor to couple composite video signals thereto, time constant circuit means including a storage capacitor, means connecting said winding on the horizontal output transformer between the collector electrodes of said NPN transistor and said storage capacitor, with recurring negative-going voltage pulses induced in said winding and coupled to said collector providing conduction between the base and collector in said NPN gating transistor in time coincidence with synchronizing signals applied to the base thereof, said capacitor being charged so that said time constant circuit means develops a control voltage in accordance with changes in the average level in said synchronizing signals, and second transistor means responsive to said control voltage to produce a corresponding change in the gain control potential supplied to said signal amplification means by said bias control circuit means.

3. In a television receiver the combination including, signal amplification means for amplifying received television signals, bias circuit means connected to said signal amplification means to supply a gain control potential thereto, detector means coupled with said signal amplifaction means for providing a composite video signal containing a synchronizing signal component, video amplification means for coupling said composite video signal to utilization means, a source of periodically recurring voltage pulses including a winding on a horizontal output transformer of the receiver, transistor means having base, collector and emitter electrodes, circuit means direct current coupling said video amplification means to the base electrode of said transistor means to couple said composite video signals thereto, time constant circuit means including a storage capacitor, means connecting said winding on the horizontal output transformer between the collector electrode of said transistor means and said storage capacitor, said winding providing pulses having a polarity for forward biasing said collector to cause collector-to-base conduction of said transistor means in time coincidence with synchronizing signals applied to the base electrode thereof, said capacitor being charged so that said time constant circuit means develops a control voltage in accordance with changes in the average level of said synchronizing signals to produce a corresponding change in the gain control potential supplied to said signal amplification means by said bias control circuit means.

4. In a television receiver the combination including signal amplification means for amplifying received television signals, bias circuit means connected to said signal amplification means to supply a gain control potential thereto, detector means coupled with said signal amplification means for providing a composite video signal containing a synchronizing signal component, video amplification means for coupling said composite video signal to utilization means, a source of periodically recurring voltage pulses including a winding on the horizontal output transformer located in the receiver, first transistor means having base, collector and emitter electrodes, circuit means direct current coupled between the base electrode of said first transistor means and said video amplification means to couple said composite video signal thereto, time constant circuit means including a storage capacitor, means for connecting said winding on the horizontal output transformer between the collector electrode of said transistor means and said storage capacitor, said winding providing pulses having a polarity for forward biasing said collector to cause collector-to-base conduction of said first transistor means in time coincidence with synchronizing signals applied to the base electrode thereof, said capacitor being charged so that said time constant circuit means develops a control voltage in accordance with changes in the average level of said synchronizing signals, second transistor means having base, emitter and collector electrodes, with the emitter and collector electrodes of said second transistor means connected between said bias circuit means and a reference potential, and circuit means including filter means for coupling said control voltage to the base electrode of saiα second transistor means to control the conduction thereof, thereby producing a corresponding change in the gain control potential supplied to said signal amplification means.

5. In a television receiver the combination including, signal amplification means having a plurality of transistor stages for translating received television signals, bias circuit means connected to said signal amplification means to supply a gain control potential thereto, detector means coupled with said signal amplification means for providing a composite video signal containing a synchronizing signal component, video amplification means for coupling said composite video signal to utilization means, a source of periodically recurring voltage pulses including a winding on the horizontal output transformer of said receiver, first transistor means having base, collector and emitter electrodes, circuit means direct current coupling said video amplification means to the base electrode of said first transistor means to couple composite video signals thereto, time constant circuit means including a storage capacitor, means connecting said winding on the horizontal output transformer between the collector electrode of said first transistor means and said storage capacitor, said winding providing pulses having a polarity for forward biasing said collector to cause collector-to-base conduction of said first transistor means in time coincidence with sychronizing signals applied to the base electrode thereof, said capacitor being charged so that said time constant circuit means develops a control voltage in accordance with changes in the average level of said synchronizing signals, a control transistor having base, emitter and collector electrodes, with the emitter and collector electrodes of said control transistor connected between said bias circuit means and a reference potential and circuit means for coupling the control voltage developed by said time constant network means to the base electrode of said control transistor, thereby producing a corresponding change in the gain control of potential supplied to said signal translating transistors by said bias control circuit means.

6. In a television receiver the combination including, signal amplification means for amplifying received television signals, bias circuit means connected to said signal amplification means to supply a gain control potential thereto, detector means coupled with said signal amplification means for providing a composite video signal containing a synchronizing signal component, video amplification means for coupling said composite video signal to utilization means, a source of periodically recurring voltage pulses including a winding on the horizontal output transformer located in said receiver, first transistor means having base, collector and emitter electrodes, circuit means direct current coupled between the base electrode of said first transistor means and said video amplification means to couple a composite video signal thereto, time constant circuit means including a storage capacitor, means for connecting said winding on the horizontal output transformer between the collector electrode of said first transistor means and said storage capacitor, said winding providing pulses having a polarity for forward biasing said collector to cause collector-to-base conduction of said first transistor means in timed coincidence with synchronizing signals applied to the base electrode thereof, said capacitor being charged so that said time constant circuit means develops a control voltage in accordance with changes in average level of said synchronizing signals, control transistor normally biased to a saturated condition having base, emitter and collector electrodes, with emitter and collector electrodes of said control transistor connected between said bias circuit means and a reference potential and circuit means for coupling the control voltage developed by said time constant network means to the base electrode of said control transistor, with increasing synchronizing signal level increasing the charge of said storage capacitor to drive said control transistor towards non-conduction thereby producing corresponding change in gain control potential supplied to said signal amplification means by said bias circuit means.

7. In a television receiver the combination including, signal amplification means for amplifying received television signals, bias circuit means connected to said signal amplification means to supply a gain control potential thereto, detector means coupled with said signal amplification means for providing a composite video signal containing a synchronizing signal component, video amplification means for coupling said composite video signal to utilization means, a source of periodically recurring voltage pulses including a winding and a horizontal output transformer located in said receiver, first transistor means having base, collector and emitter electrodes, circuit means direct current coupled between the base electrode of said first transistor means and said video amplification means to couple a composite video signal thereto, time constant circuit means including a storage capacitor, means for connecting said winding on the horizontal output transformer between the collector electrode of said first transistor means and said storage capacitor, said winding providing pulses having a polarity for forward biasing said collector to cause collector-to-base conduction of said first transistor means in timed coincidence with synchronizing signals applied to the base electrode thereof, said capacitor being charged so that said time constant circuit means develops a control voltage in accordance with changes in average level of said synchronizing signals, a control transistor normally biased to cutoff having base, emitter and collector electrodes, with the emitter and collector electrodes of said control transistor connected between said bias circuit means and a reference potential, and circuit means for coupling the control voltage developed by said time constant network means to the base electrode of said control transistors, with increased synchronizing signal level decreasing the charge of said storage capacitor to drive said control transistor toward saturated condition thereby producing forward bias for the signal amplification means.

References Cited by the Examiner

UNITED STATES PATENTS

| | | | |
|---|---|---|---|
| 2,864,888 | 12/1958 | Goodrich | 178—7.3 |
| 2,906,817 | 9/1959 | Kidd et al. | 178—7.3 |
| 3,115,547 | 12/1963 | Tschannen | 178—7.3 |

DAVID G. REDINBAUGH, *Primary Examiner.*